United States Patent

[11] 3,572,667

| [72] | Inventors | Rudolf Hess<br>Frankfurt-Main;<br>Horst Seidel, Bischofsheim, Germany |
|---|---|---|
| [21] | Appl. No. | 766,481 |
| [22] | Filed | Oct. 10, 1968 |
| [45] | Patented | Mar. 30, 1971 |
| [73] | Assignee | Dravo Corporation<br>Pittsburgh, Pa. |
| [32] | Priority | Oct. 21, 1967 |
| [33] | | Germany |
| [31] | | P 15 83 474.9 |

[54] CIRCULAR TRAVELING GRATE MACHINE OR THE LIKE
8 Claims, 2 Drawing Figs.

[52] U.S. Cl. .................................................... 266/21
[51] Int. Cl. .................................................. F27b 21/02
[50] Field of Search .......................................... 266/13, 20, 21

[56] References Cited
UNITED STATES PATENTS

| 1,433,354 | 10/1922 | Dwight .......................... | 266/21 |
| 2,493,421 | 1/1950 | Rolfsen ......................... | 266/21 |
| 2,859,957 | 11/1958 | Rolfsen ......................... | 266/21 |
| 3,160,402 | 12/1964 | Mexer et al. ................... | 266/21X |

*Primary Examiner*—Harrison L. Hinson
*Attorney*—Parmelee, Utzler and Welsh

ABSTRACT: A circular traveling grate machine comprising an annular series of segment-shaped carriages is disclosed. Each of the carriages has inner and outer wheels and concentric inner and outer tracks are provided on which the inner and outer wheels respectively roll. The outer track is elevated above the inner one such that the surfaces of the carriages slope downwardly to the center of the machine.

INVENTORS
RUDOLF HESS
& HORST SEIDEL

By Parmelee, Utzler & Welsh
his Attorneys 3,572,667

CIRCULAR TRAVELING GRATE MACHINE OR THE LIKE

FIELD OF THE INVENTION

This invention relates to a traveling grate apparatus or the like and more particularly to such an apparatus having an annular hearth.

BACKGROUND OF THE INVENTION

Traveling grate machines and the like for firing, roasting, sintering, pelletizing, etc., most widely used are of the endless belt type wherein material to be thermally treated is carried on pallets horizontally along a top reach of the machine while the pallets return empty on the lower reach so that only about 40 percent of the hearth surface is in use at any one time. For this reason circular-type apparatus is desirable, since 80 to 85 percent of the grate or hearth surface may be productively utilized all of the time. However, the use of circular types of machines has been limited due to the fact that under the high temperatures that such machines must at times be operated, thermal expansions and stresses developing in the apparatus cannot be adequately relieved, resulting in the damage or permanent deformations to parts of the apparatus.

Usually circular traveling grate and similar roasting apparatus of this type comprises a succession of segment-shaped wheeled carriages forming a substantially continuous annulus. The carriages have inner and outer wheels traveling on concentric inner and outer rails with provision at some point in the circular travel for tilting the carriages in succession to dump material therefrom after the material has been fired, roasted, or sintered as the case may be. The beds of the carriages provide a hearth for carrying a load of loose material, and in most cases the hearth is comprised of grates that support the material while gases flow vertically through the bed between hoods above the apparatus and windboxes between the rails below the carriages. In such apparatus, thermal expansion both radially and circumferentially present especially difficult problems. The massive structure of the carriages develops substantial centrifugal forces even at relatively low speeds, and this, in conjunction with radial expansion as well as circumferential expansion, are destructive to wheel flanges as well as to the circular rails which are not subjected to the same high temperatures. The length of the carriages is made such that when they are cold they may be slightly spaced, but as circumferential expansion takes place they move into close contact, but if radial expansion outwardly is greatly restrained, the tightly wedged carriages impose additional stresses on the apparatus and the wheel flanges.

Attempts have been made to overcome those difficulties in such machines but thus far these attempts have not been fully successful. Water cooling various parts of the circular machines, such as the axles, grate bars and sidewalls of the wheeled carriages has been proposed. Aside from high heat losses resulting from water cooling, and the need for an adequate supply of cold water, mechanical problems in maintaining watertight seals between fixed and moving parts have been expensive and been a source of much difficulty.

Another problem encountered in circular machines is that in moving the wheeled carriages, which if joined together in a closed circle and arranged on spaced circular concentric tracks disposed in a horizontal plane, as is the usual case, besides the driving force or power necessary for causing the carriages to advance, an additional force must be provided on the carriages to overcome the influence of centrifugal force produced by the carriages as they move along the curved path provided by the tracks. This additional force is normally produced by providing integral flanges on the wheels of the carriages which engage the tracks or by guide rollers secured to the carriages which roll on the sides of the tracks. But these two expedients have not been satisfactory due to the temperature variations which the carriages encounter in operation. Under the influence of high temperatures, the carriages will expand in the length and width, thereby enlarging the diameter of the running circle of the carriages while the mean diameter of the tracks remains substantially the same. This results in very strong forces acting on the wheel flanges or guide rollers which may damage or cause them to break. Providing play between the wheel flanges or guide rollers and the tracks is not an adequate remedy to this problem, because if the play of the wheel flanges or guide rollers is adapted to the necessary measure of expansion, the carriages will not move freely and smoothly around the tracks in a circle, but instead, they will tend to move out of line.

SUMMARY OF THE INVENTION

The problems discussed above are substantially reduced, if not entirely eliminated, by the present invention which provides an annular apparatus for the heat treatment of material in which the thermal expansions and stresses occuring during operations of the apparatus are compensated for without the use of water cooling devices or the use of wheel flanges or guide rollers as these later parts have heretofore been used.

Briefly, the present invention provides an annular traveling grate machine wherein the roasting surface provided by the grate bars of each wheeled carriage is in the form of an annular segment or trapezoid. The wheeled carriages are arranged in a circle and adapted to move on an inclined or banked trackway. The tracks and the roasting surface provided by the grate bars of the carriages are so inclined toward the center of the apparatus so as to form the generatrix of a vertically disposed, hollow, truncated cone tapering downwardly towards the center of the apparatus.

Each or several of the wheeled carriages may be self-propelled and each carriage may be provided with a guide roller positioned to ride against the outer surface of the outer rail or the trackway, or the outside wheels of the carriages may be provided with flanges on their outside faces which are engageable with the outer rail of the trackway.

With this arrangement, because the carriages move on an inclined trackway, the component of gravity acting on the carriages and directed towards the center of the circular trackway provides the so-called additional force required to overcome the centrifugal force, as discussed above, and thus keeps the carriages moving in a circular path without restraining flanges on the wheels.

The guide rollers or wheel flanges riding against the outer face of the outer rail are not strained by centrifugal force, and are for the purpose of preventing the individual carriages from moving radially inward on the banked trackway when the carriages are placed thereon and to guide the carriages around the tracks when the apparatus is not at a sufficiently high temperature to cause the carriages to expand or becoming too tightly wedged together.

However, when the carriages expand in length during operation at elevated temperatures, there is an end-to-end contact or a force-closing connection effected between the end surfaces of the adjacent carriages and also because of this expansion, the running circle of the carriages necessarily enlarges, but since there are no guide rollers or wheel flanges as are normally provided on circular machines, the carriages are free to move outwardly on the tracks. Thus the running circle of the carriages will automatically adjust to compensate for temperature expansions, and in the closed circle of carriages, the guide rollers or wheel flanges that are provided will move or disengage from the outer track and the carriages will then restrain each other against radial movement inward.

In order to obtain these desired results, the inclination of the tracks and of the roasting surface towards the center of the apparatus is on the one hand so chosen that it is smaller than the angle of repose of the material to be treated, so that a layer of loose material of the desired depth can be loaded onto and kept on the carriages, and on the other hand, so chosen that it is larger than the friction angle formed between the abutting surface of the various carriages so that the end-to-end contact between adjacent carriages is maintained. The so-called friction angle is defined as that angle whose tangent corresponds to the coefficient of friction between two materials, here the abutting surfaces of adjacent carriages. Stated another way, the angle of inclination must be so chosen so as to be smaller than the angle of repose of the material to be treated and also so chosen, such that the gravity component, as above described, is larger than the friction between the individual grate carriages when a force-closing thereof is effected due to heat expansion so that the carriages will be supported and guided around the trackway.

A more complete understanding of the invention and the advantages thereof will become apparent from the following description, taken in conjunction with the accompanying drawings showing only a preferred embodiment of the invention.

DESCRIPTION OF THE PREFERRED EMBODIMENTS

Figure 1:
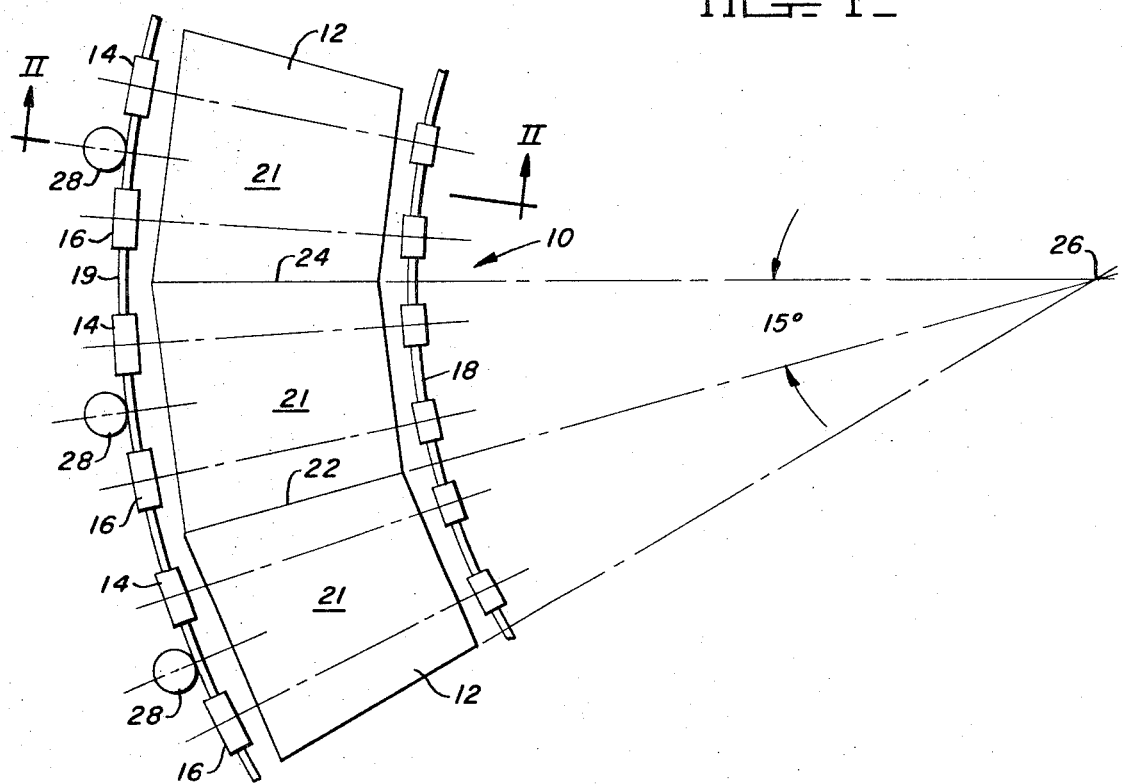
FIG. 1 is a partial plan view illustrating schematically a circular traveling grate machine according to the invention.

Referring now to the drawings wherein like reference numerals refer to like parts throughout the several views, the annular or circular traveling grate machine is shown generally at 10. While only three traveling grate carriages 12 are shown in FIG. 1, it is to be understood that a sufficient number are utilized so as to form a complete circle of carriages as would be viewed in plan. In a preferred form of the invention, there are 24 grate carriages 12, each having front and rear wheels 14 and 16 respectively, which ride on concentric inner and outer circular tracks or rails 18 and 19 respectively. The rails 18 and 19 are supported on an inclined or banked trackway 20. Each of the carriages have a hearth surface 21. The hearth surface 21 is preferably made up of grate bars (not shown) which support the material but which are pervious to the flow of gasses therethrough as required for most burning, roasting and calcining operations.

Figure 2:
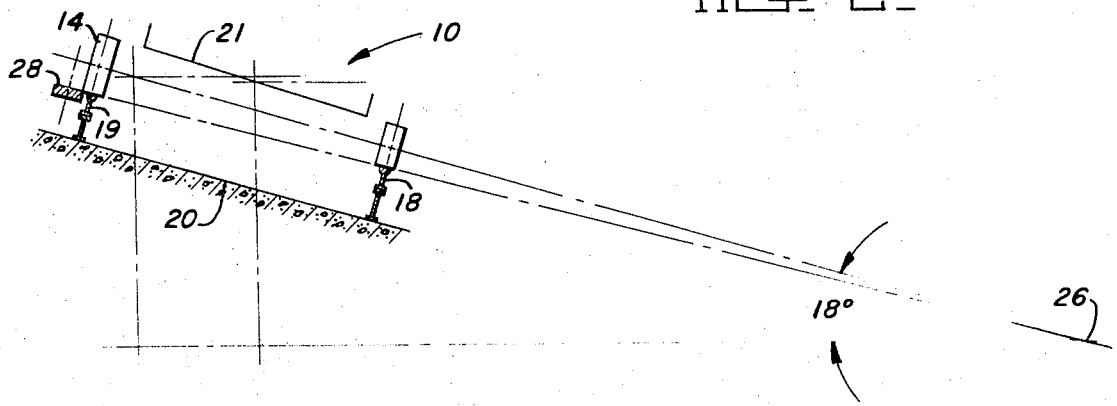
FIG. 2 is a vertical section through the circular traveling grate machine shown in FIG. 1 illustrating the inclination of the apparatus with respect to the horizontal.

As seen in FIG. 2, the rails 18 and 19 are shown as being inclined by 18° relative to the horizontal with the outer rail 19 being elevated above the inner rail 18. As seen in FIG. 1, the grate carriages are each designed in the shape of a trapezoid having ends 22 and 24, which ends, when projected towards the center 26 of the annular roasting machine 10, form an angle of 15° therebetween. These angles are merely illustrative as will hereinafter appear.

The materials generally heat treated on the instant circular traveling grate machine 10, usually have an angle of repose between 10°—40°, preferably 15°—25°, and the carriages 12 are generally constructed of steel whereby a friction angle of 10°—12 develops at the abutting surfaces of the grate carriages 12. Therefore, the angle of inclination of the tracks and of the roasting surface relative to the horizontal is chosen to be between 10°—40° and preferably 15°—25° and is here shown as 18°. And, the angle formed between the ends of the carriages when these ends are projected towards the center of the apparatus 10 is chosen to be larger than the friction angle of 10°—12° usually developing between the carriages, and is here shown as 15°.

With this arrangement, even though the outer rail 19 is disposed in a plane higher than that in which the inner rail 18 is disposed, each hearth surface 21 will be able to retain and hold a charge of loose material thereon of a substantially uniform depth notwithstanding the differences in the elevation of the inner and outer rails.

At the outside of each grate carriage 12 there is provided a guide roller 28 which engages the outer track and assures that the individual carriages cannot move radially inward off the inclined tracks when the carriages are initially placed thereon and which guide the carriages 12 around the tracks when the apparatus is not at a sufficiently high temperature to cause the carriages to expand into abutting relation. Integral wheel flanges may be provided in place of the guide rollers 26, if so desired, to accomplish the same purposes.

To illustrate the principles of the invention, an example of some operating and design considerations will be given. Assuming the grate carriages 12 to have a width of 4m. and a mean length of 5m., then with 24 carriages the mean circular length of the carriages or the running circle of the carriages in a cold condition will be approximately 120m. The mean diameter of the running circle will accordingly be 28.2m. which is also the mean diameter of the tracks. At a coefficient of heat expansion of 13×10−6/° C. for steel and a temperature increase such as 300° c., the mean circular length of the carriages expands by 470mm. which means the running circle of the carriages increases to 120.47m. Accordingly, the diameter of the running circle increase to 38.35m., corresponding to a 150mm. increase in diameter compared to the diameter in a cold condition, whereas the mean diameter of the tracks remains substantially the same as before.

As can be seen from the above example, as the running circle of the carriages expands under the influence of elevated temperatures, if wheel flanges or guide rollers were provided on the carriages to overcome the influence of centrifugal force produced by the carriages as they move around the tracks, there would be very strong forces acting on them which may damage or cause them to break. But as there are no wheel flanges or guide rollers on the carriages for this purpose, and because the running circle of the carriages is free to adjust itself, the carriages are free to move outwardly on the tracks. As the carriages expand there will be an automatic end-to-end contact or force-closing connection effected between the end surfaces of adjacent carriages, the guide rollers 28 will move or disengage from the outer track and because the angle formed between the ends of the carriages when these ends are projected towards the center of the apparatus 10 is so chosen as to be larger than the friction angle developing between the abutting surfaces of the carriages, the carriages will restrain each other and they cannot move out of line.

We claim:

1. A circular traveling grate machine having a roasting surface moved on a circular track characterized in that the track and roasting surface are inclined toward the center of the machine so that they form the generatrix of a vertically disposed, hollow, truncated cone tapering downwardly.

2. A circular traveling grate machine according to claim 1 wherein the track and roasting surface have an inclination of 10°—40 relative to the horizontal.

3. A circular traveling grate machine according to claim 1 wherein the track and roasting surface have an inclination of 15°—25 relative to the horizontal.

4. A circular traveling grate machine according to claim 1 wherein the roasting surface is provided by the hearth surfaces of a plurality of wheeled traveling grate carriages.

5. A circular traveling grate machine as defined in claim 4 wherein the roasting surface provided by each of the wheeled carriages has the shape of a trapezoid.

6. A circular traveling machine as defined in claim 4 wherein each of the wheeled carriages has a guide roller adapted to engage the outer track of the circular track.

7. A traveling grate machine comprising an annular series of segment-shaped carriages, each with inner and outer wheels, and concentric inner and outer tracks on which the inner and outer wheels respectively of the carriages roll with the outer track being in a plane sufficiently higher than that in which the inner one is disposed such that the surfaces of the carriages slope downwardly to the center of the machine.

8. A traveling grate machine or the like having concentric inner and outer circular rails with the outer rail being elevated above the inner one and having an annular series of segment-shaped carriages each with inner and outer wheels that roll on the respective circular rails, each carriage having a hearth surface arranged to retain and hold a charge of loose material thereon to a substantially uniform depth notwithstanding the difference in the elevation of the inner and outer rails.